T. BRETT.
Harvester.

No. 40,601.

Patented Nov. 17, 1863.

Witnesses
J W Coombs
Geo. W. Rees

Inventor
Thomas Brett
per Munn & Co
Attorneys

UNITED STATES PATENT OFFICE.

THOMAS BRETT, OF GENEVA, OHIO.

IMPROVEMENT IN HARVESTERS.

Specification forming part of Letters Patent No. 40,601, dated November 17, 1863.

*To all whom it may concern:*

Be it known that I, THOMAS BRETT, of Geneva, in the county of Ashtabula and State of Ohio, have invented a new and useful Improvement in Applying Seats to Harvesters; and I do hereby declare that the following is a full, clear, and exact description of the same, reference being had to the accompanying drawings, making a part of this specification, in which—

Figure 1:
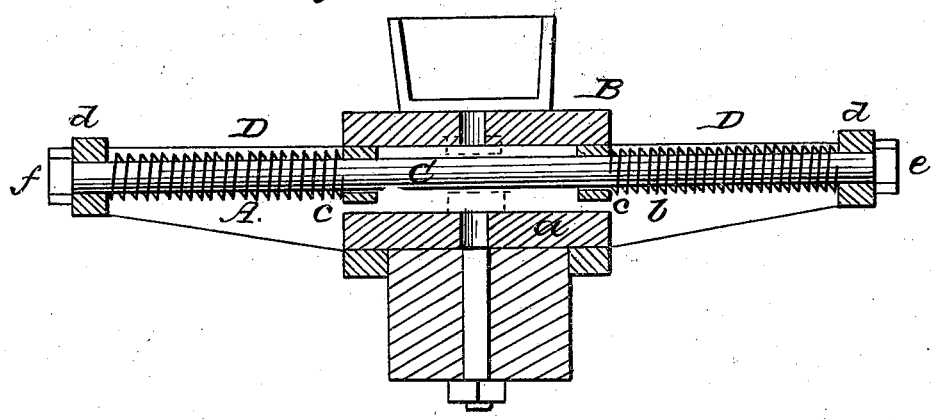
Figure 2:
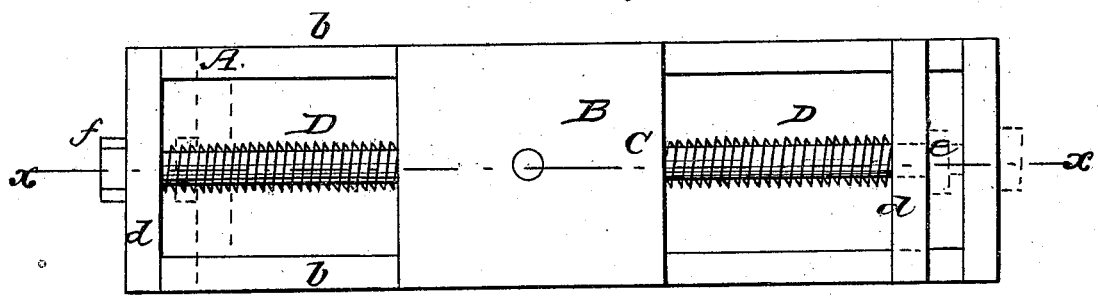

Figure 1 is a vertical section of my improvement, taken in the line $x\,x$, Fig. 1; Fig. 2, a plan or top view of the same.

Similar letters of reference indicate corresponding parts in the two figures.

The object of this invention is to apply a seat to a harvester in such a manner that the seat will not be subjected to the sudden movements and shocks or concussions produced by the harvester as it is drawn along, and the driver therefore not be liable, as heretofore, to be thrown from the seat.

To enable those skilled in the art to fully understand and construct my invention, I will proceed to describe it.

A represents a frame, which may be of rectangular or other suitable form, and which is secured to the frame of the harvester by means of a bolt passing centrally through a plate, $a$, attached to the center of the bottom or lower part of the frame A. A spring or springs may, if desired, be interposed between the frame A and the harvester-frame, in order to form an elastic or yielding connection.

On the frame A there is placed a plate, B, the front and back parts of which rest on the front and back bars, $b\,b$, of the frame A. This plate B has pendants $c\,c$ attached to it, one at each end, said pendants projecting down between the bars $b\,b$ of the frame A, and having a rod, C, passing through them, the ends of which pass through the ends $d\,d$ of the frame A, one end of said rod having a head, $e$, and the other end having a screw-nut, $f$, upon it. On this rod C there are placed two spiral springs, D D, the outer ends of which bear against the ends $d\,d$ of the frame A, the inner ends bearing against the pendants $c\,c$ of the plate B, as shown clearly in Fig. 1.

To the plate B the driver's seat is attached by a bolt, as shown in red in Fig. 1.

From the above it will be seen that the frame A will move laterally under the action of the harvester as the latter is drawn along, said frame sliding under the plate B, the latter under the weight of the driver not moving materially and not being subject to any jars or concussions by the lateral movements of the harvester. The springs D serve to steady the plate B and retain it in position. The driver consequently will not be liable to be thrown from his seat—a contingency of not unfrequent occurrence in using the ordinary harvesters.

Having thus described my invention, what I claim as new, and desire to secure by Letters Patent, is—

The frame A, attached to the harvester, in combination with the plate B and springs D D, all arranged to operate in the manner substantially as and for the purpose herein set forth.

THOS. BRETT.

Witnesses:
   J. N. FITCH,
   T. D. LESLIE.